(12) United States Patent
Merchant et al.

(10) Patent No.: US 11,215,148 B2
(45) Date of Patent: Jan. 4, 2022

(54) VEHICLE POWERTRAIN WITH ON-BOARD CATALYTIC REFORMER

(71) Applicants: ExxonMobil Research and Engineering Company, Annandale, NJ (US); KABUSHIKI KAISHA TOYOTA CHUO KENKYUSHO, Aichi-ken (JP)

(72) Inventors: Shamel Merchant, Bridgewater, NJ (US); Eugine Choi, Marlton, NJ (US); Walter Weissman, Basking Ridge, NJ (US); Tilman W. Beutel, Neshanic Station, NJ (US); John F. Brody, Bound Brook, NJ (US); Gerardo Majano, Raritan, NJ (US); Karl G. Strohmaier, Port Murray, NJ (US); Brian Weiss, Bridgewater, NJ (US); Robert J. Colby, Annandale, NJ (US); Makoto Koike, Aichi (JP); Hiroshi Miyagawa, Aichi (JP); Seiji Yamamoto, Aichi (JP)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 109 days.

(21) Appl. No.: 16/502,275

(22) Filed: Jul. 3, 2019

(65) Prior Publication Data

US 2020/0018268 A1    Jan. 16, 2020

Related U.S. Application Data

(60) Provisional application No. 62/697,028, filed on Jul. 12, 2018.

(51) Int. Cl.
*F02M 26/35* (2016.01)
*F02M 27/02* (2006.01)
(Continued)

(52) U.S. Cl.
CPC ............ *F02M 26/35* (2016.02); *F02M 27/02* (2013.01); *B01J 23/464* (2013.01);
(Continued)

(58) Field of Classification Search
CPC ........ F02M 26/35; F02M 27/02; F02M 26/36; B01J 23/464; B01J 29/7015;
(Continued)

(56) References Cited

U.S. PATENT DOCUMENTS

| | | | | | |
|---|---|---|---|---|---|
| 2,928,785 | A | * | 3/1960 | Hirschler | ............... C10G 11/02 208/117 |
| 3,114,696 | A | * | 12/1963 | Weisz | ...................... C10L 1/06 208/66 |

(Continued)

FOREIGN PATENT DOCUMENTS

| | | | | |
|---|---|---|---|---|
| FR | 2928699 A1 | * | 9/2009 | ............. F02D 21/08 |
| FR | 2943734 A1 | * | 10/2010 | ............. F02M 25/12 |

(Continued)

OTHER PUBLICATIONS

Xie, "Influence of sulfur on the carbon deposition in steam reforming of liquid hydrocarbons over CeO2—Al2O3 supported Ni and Rh catalysts", Applied Catalysis A: General 394 (2011) 32-40.
(Continued)

*Primary Examiner* — Sizo B Vilakazi
*Assistant Examiner* — Brian R Kirby
(74) *Attorney, Agent, or Firm* — Roberts Calderon Safran & Cole P.C.

(57) ABSTRACT

A power system comprises an engine configured to combust an air/fuel mixture and produce a flow of exhaust gas; an exhaust passageway fluidly connected to the engine to receive the flow of exhaust gas; an exhaust gas recirculation loop fluidly connecting the exhaust passageway to a fuel intake for the engine; a first conversion zone containing a
(Continued)

fuel reforming catalyst located within the exhaust gas recirculation loop; and a second conversion zone located within the exhaust gas recirculation loop separate from and downstream of the first conversion zone stream, the second conversion zone containing a fuel cracking catalyst.

19 Claims, 10 Drawing Sheets

(51) Int. Cl.
    *B01J 23/46*      (2006.01)
    *B01J 29/70*      (2006.01)
    *B01J 29/74*      (2006.01)
    *C10G 35/095*      (2006.01)
    *C10G 47/14*      (2006.01)

(52) U.S. Cl.
    CPC ........ *B01J 29/7015* (2013.01); *B01J 29/7088* (2013.01); *B01J 29/7476* (2013.01); *C10G 35/095* (2013.01); *C10G 47/14* (2013.01)

(58) Field of Classification Search
CPC . B01J 29/7088; B01J 29/7476; C10G 35/095; C10G 47/14
See application file for complete search history.

(56) References Cited

U.S. PATENT DOCUMENTS

| | | | | |
|---|---|---|---|---|
| 3,714,022 A * | 1/1973 | Stine | ............ | C10G 59/02 208/62 |
| 3,717,129 A * | 2/1973 | Fox | ............ | F02M 25/0224 123/1 A |
| 3,719,586 A * | 3/1973 | Benner | ............ | C10G 47/00 208/66 |
| 3,756,940 A * | 9/1973 | Donaldson | ............ | C10G 61/06 208/66 |
| 3,899,411 A * | 8/1975 | Bonacci | ............ | C10G 59/02 208/66 |
| 3,915,125 A * | 10/1975 | Henkel | ............ | F02M 27/02 123/3 |
| 3,918,412 A * | 11/1975 | Lindstrom | ............ | F02M 25/00 123/3 |
| 4,028,225 A * | 6/1977 | Wilhelm | ............ | B01J 23/628 208/139 |
| 4,036,180 A * | 7/1977 | Noguchi | ............ | F02B 43/10 123/3 |
| 4,046,522 A * | 9/1977 | Chen | ............ | C01B 3/22 48/102 A |
| 4,175,523 A * | 11/1979 | Noguchi | ............ | F02M 27/02 123/3 |
| 4,178,230 A * | 12/1979 | Johnson | ............ | C10G 69/08 208/66 |
| 4,244,811 A * | 1/1981 | Grenoble | ............ | C01B 3/363 208/118 |
| 4,735,186 A * | 4/1988 | Parsons | ............ | F02M 26/36 123/3 |
| 5,357,908 A * | 10/1994 | Sung | ............ | F02M 27/02 123/3 |
| 5,571,763 A * | 11/1996 | Takemoto | ............ | B01D 53/945 502/334 |
| 6,079,373 A * | 6/2000 | Kawamura | ............ | F01N 3/0857 123/3 |
| 6,310,265 B1 * | 10/2001 | Chester | ............ | C07C 5/2702 585/739 |
| 6,655,130 B1 * | 12/2003 | Kirwan | ............ | F01N 3/2006 60/284 |
| 6,887,436 B1 * | 5/2005 | Fisher | ............ | B01J 8/0221 422/177 |
| 6,997,142 B2 * | 2/2006 | Wakao | ............ | F02M 27/02 123/3 |
| 7,198,711 B1 * | 4/2007 | Chester | ............ | B01J 29/70 208/108 |
| 7,536,981 B2 * | 5/2009 | Sadikay | ............ | F02M 27/02 123/1 A |
| 8,061,120 B2 * | 11/2011 | Hwang | ............ | F01N 3/0842 60/273 |
| 8,181,445 B2 * | 5/2012 | Duvinage | ............ | F01N 3/20 60/286 |
| 8,246,700 B1 * | 8/2012 | Kutsin | ............ | C10K 1/024 48/197 R |
| 8,307,790 B2 * | 11/2012 | Leone | ............ | F02D 41/021 123/3 |
| 8,607,743 B2 * | 12/2013 | Yahagi | ............ | F02M 25/12 123/3 |
| 8,671,662 B2 * | 3/2014 | Onodera | ............ | B01D 53/9445 60/285 |
| 9,032,913 B2 * | 5/2015 | Hoshino | ............ | C01B 3/384 123/3 |
| 9,623,376 B2 * | 4/2017 | Hirabayashi | ......... | B01J 19/2485 |
| 9,797,349 B2 * | 10/2017 | Henry | ............ | F02M 26/06 |
| 10,612,497 B2 * | 4/2020 | Voice | ............ | F02M 25/028 |
| 2001/0026777 A1 * | 10/2001 | Negishi | ............ | H01M 8/04761 422/112 |
| 2002/0012618 A1 * | 1/2002 | Bromberg | ............ | H01M 8/0662 422/626 |
| 2003/0101713 A1 * | 6/2003 | Dalia | ............ | F01N 3/0871 60/284 |
| 2006/0042565 A1 * | 3/2006 | Hu | ............ | F02M 31/14 123/3 |
| 2006/0168939 A1 * | 8/2006 | Otsubo | ............ | F01N 3/0253 60/274 |
| 2006/0179717 A1 * | 8/2006 | LaBarge | ............ | B01J 37/0009 48/127.9 |
| 2006/0277897 A1 * | 12/2006 | Slone | ............ | F01N 3/206 60/286 |
| 2007/0130831 A1 | 6/2007 | Vipperla et al. | | |
| 2007/0220873 A1 * | 9/2007 | Bosteels | ............ | F01N 3/10 60/299 |
| 2008/0011646 A1 | 1/2008 | Giroux et al. | | |
| 2008/0041766 A1 | 2/2008 | Giroux et al. | | |
| 2008/0280171 A1 * | 11/2008 | Maenishi | ............ | C01B 3/384 429/412 |
| 2008/0295501 A1 * | 12/2008 | Gong | ............ | F02M 26/22 60/299 |
| 2009/0178396 A1 * | 7/2009 | Yezerets | ............ | F02M 26/28 60/299 |
| 2011/0039686 A1 | 2/2011 | Li et al. | | |
| 2012/0145096 A1 * | 6/2012 | Shimada | ............ | F02D 19/0671 123/3 |
| 2012/0167840 A1 * | 7/2012 | Miyagawa | ............ | F02D 19/0671 123/3 |
| 2013/0116118 A1 | 5/2013 | Milanov et al. | | |
| 2014/0196702 A1 * | 7/2014 | Gingrich | ............ | F02M 26/43 123/568.21 |
| 2015/0166913 A1 * | 6/2015 | Brody | ............ | F02M 27/02 48/127.7 |
| 2015/0167587 A1 * | 6/2015 | Weiss | ............ | F02M 26/35 60/605.1 |
| 2015/0311549 A1 * | 10/2015 | Kita | ............ | C01B 3/38 429/419 |
| 2016/0341117 A1 * | 11/2016 | Ekstrom | ............ | F02B 47/02 |
| 2016/0341157 A1 * | 11/2016 | Henry | ............ | F02M 26/36 |
| 2017/0333843 A1 * | 11/2017 | Aoyagi | ............ | F02M 26/36 |
| 2018/0169623 A1 * | 6/2018 | Weiss | ............ | C10L 3/08 |

FOREIGN PATENT DOCUMENTS

| | | |
|---|---|---|
| JP | 2004051437 A | 2/2004 |
| JP | 2005340008 A | 12/2005 |
| JP | 2011183346 A | 9/2011 |
| JP | 2012061399 A | 3/2012 |
| KR | 2013074843 A | 7/2013 |
| WO | 201368904 A1 | 5/2013 |

(56) References Cited

OTHER PUBLICATIONS

Cimino, "Sulphur inhibition on the catalytic partial oxidation of methane over Rh-based monolith catalysts", Applied Catalysis A: General 360 (2009) 43-49.

Zheng, "Steam reformingofsulfur-containingdodecaneonaRh-Ptcatalyst: Influence of Influence of process parameters on catalyst stability and coke", Applied CatalysisB:Environmental160-161(2014)525-533.

Lakhapatri, "Sulfur poisoning of Rh-Ni catalysts during steam reforming of sulfur-containing liquid fuels", Catal. Sci. Technol., 2013, 3, 2755-2760.

Simson, "Steam reforming of ethanol/gasoline mixtures: Deactivation, regeneration and stable performance", Applied Catalysis B: Environmental 106 (2011) 295-303.

Lakhapatri, "Deactivation due to sulfur poisoning and carbon deposition on Rh—Ni/Al2O3 catalyst during steam reforming of sulfur-doped n-hexadecane". Applied Catalysis A: General 364 (2009) 113-121.

McCoy, "Performance of Sulfur Tolerant Reforming Catalysts for Production of Hydrogen from Jet Fuel Simulants", Energy & Fuels 2007, 21, 3513-3519.

Peucheret, "Exhaust-gas reforming using precious metal catalysts", Applied Catalysis B: Environmental 65/3-4 201-206.

Ferrandon, "Autothermal reforming catalysts for use in fuel processors for automotive and stationary H(sub)2 production", AIChE Annual Meeting, Conference Proceedings (2004 AIChE Annual Meeting, Austin, TX 20041107-20041112)8p (2004).

Whittington, "Vehicle exhaust catalysis-1. The relative importance of catalytic oxidation, steam reforming and water-gas shift reactions", International Catalysis and Zeolites Symposium (Hsinchu, Taiwan Aug. 29-30, 1994) Catalysis Today V26 N.1 41-45 (Aug. 30, 95).

International Search Report and Written Opinion issued in the corresponding Application No. PCT/US2019/040461 dated Oct. 16, 2019.

* cited by examiner

VEHICLE POWERTRAIN WITH ON-BOARD CATALYTIC REFORMER

CROSS REFERENCE TO RELATED APPLICATIONS

This application claims the benefit of the filing date of U.S. Provisional Application No. 62/697,028 filed Jul. 12, 2018, the entire contents of which are incorporated herein by reference.

FIELD

This present disclosure relates to a vehicle powertrain with an on-board catalytic reformer and to a method of operating such a vehicle powertrain.

BACKGROUND

The fuel efficiency of modern cars has improved by 20 percent since 2010, as a result of improvements in engine design, weight reductions, and the use of hybrid technologies. But while these improvements have enabled manufacturers to meet their 2015 targets for reducing carbon dioxide emissions, car makers are still 15-30 percent short of their 2020/21 target of 95 g/km. To help meet this target, renewed interest is being focused on on-board catalytic reformers capable of improving the fuel economy and therefore reducing greenhouse gas emissions of internal combustion engines.

On-board reforming technology has been studied for over twenty five years (see, for example, U.S. Pat. No. 4,884,531) and involves catalytically converting low octane fuel injected into an exhaust gas recirculation (EGR) loop of a vehicle powertrain into a high octane mixture of syngas, aromatics and cracked products using steam and heat from the engine exhaust. The fuel converter contains a precious metal based reforming catalyst to convert paraffins and alkylated aromatics in the fuel into syngas and benzene by steam reforming, including reactions such as 1 and 2 below:

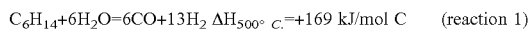

$C_6H_{14}+6H_2O=6CO+13H_2 \ \Delta H_{500°\ C.}=+169$ kJ/mol C   (reaction 1)

$C_7H_8+H_2O=C_6H_6+CO+2H_2 \ \Delta H_{500°\ C.}=+25$ kJ/mol C   (reaction 2)

The above reactions are endothermic and recover a part of the waste heat contained in the engine exhaust as fuel enthalpy. The process also increases the fuel octane because syngas has a higher octane value than the raw fuel.

More recent proposals, such as that disclosed in U.S. Pat. No. 9,617,490, have combined the reforming catalyst with a cracking catalyst, such as a metal-promoted molecular sieve, to convert paraffins in the fuel into small olefins and hydrogen by reactions such as 3 below:

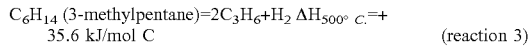

$C_6H_{14}$ (3-methylpentane)$=2C_3H_6+H_2 \ \Delta H_{500°\ C.}=+35.6$ kJ/mol C   (reaction 3)

The addition of the cracking catalyst further increases the fuel octane because olefinic reaction products carry higher octane than the raw fuel. An additional advantage of the process is that it enables the application of higher EGR rates by producing $H_2$ and olefins which promote high combustion speed. The dilution of the intake air/fuel mixture by recirculated exhaust further increases the knock resistance.

One problem of such state-of-the art reforming catalysts is their sensitivity to fuel sulfur. Sulfur containing organic compounds, such as mercaptans, sulfides, and thiophenes, contained in fuel deposit sulfur on the metals used in reforming catalysts. This leads to a reduction in fuel reforming activity. The art teaches that this problem can be mediated by raising the converter inlet temperature via pre-combustion of a portion of fuel by air. However, the pre-combustion of fuel causes a fuel penalty which offsets the heating value gain from the reforming process. In addition, where the converter includes a cracking catalyst in addition to the reforming catalyst, raising the converter temperature increases the risk of thermal deactivation of the cracking catalyst both during normal operation and during catalyst regeneration.

There is, therefore, significant interest in developing vehicle powertrains with improved on-board catalytic reformer systems and methods of operating such systems.

SUMMARY

According to the present disclosure, it has now been found that, by physically separating the reforming and cracking catalysts such that the reforming catalyst is positioned upstream of the cracking catalyst, the operational efficiency of catalytic reformer systems can be improved. In particular, the temperature of the reforming and cracking functions can be independently controlled both during normal operation and regeneration, with the temperature of the reforming catalyst being higher than that of the dehydrocracking catalyst. In this way, stable and optimized operation of the reforming catalyst can be achieved even with sulfur-containing fuels, while the endotherm across the reformer during fuel reforming leads to a temperature drop and consequently lowers the inlet temperature to the cracking catalyst thereby protecting the cracking catalyst against thermal damage at the time when the fuel is processed. In addition, it is found that the cracking catalyst is less sulfur sensitive than the reforming catalyst and can convert paraffinic fuel into small olefins at temperatures of about 500 to 550° C. even in the presence of sulfur containing fuel. Even with appropriate $O_2$ regeneration treatments typical reforming catalysts require a minimum temperature range of about 550 to 600° C. when operated on sulfur containing feeds.

Thus, in one aspect, the present disclosure resides in a power system comprising:

an engine configured to combust an air/fuel mixture and produce a flow of exhaust gas;

an exhaust passageway fluidly connected to the engine to receive the flow of exhaust gas;

an exhaust gas recirculation loop fluidly connecting the exhaust passageway to a fuel intake for the engine;

a first conversion zone containing a fuel reforming catalyst located within the exhaust gas recirculation loop; and a second conversion zone located within the exhaust gas recirculation loop separate from and downstream of the first conversion zone stream, the second conversion zone containing a fuel cracking catalyst.

In one embodiment, the system further comprises a pre-combustion catalyst located within the exhaust gas recirculation loop upstream of the fuel reforming catalyst for raising the temperature of the exhaust gas by catalytic partial oxidation of fuel.

In a further aspect, the present disclosure resides in a method of operating the power system of the one aspect, the method comprising:

(a) supplying a mixture comprising exhaust gas and a first hydrocarbon-containing fuel to the first conversion zone at a first temperature to convert a portion of the fuel in the presence of the reforming catalyst into CO and $H_2$ to produce a reformed gaseous mixture;

(b) supplying the reformed gaseous mixture to the second conversion zone at a second temperature lower than the first temperature to convert paraffins in a further portion of the fuel in the presence of the cracking catalyst into olefins to produce a reformed and cracked gaseous mixture;

(c) introducing at least a portion of the reformed and cracked gaseous mixture and a second hydrocarbon-containing fuel into the engine, wherein said second hydrocarbon-containing fuel may be the same or different from the first hydrocarbon-containing fuel;

(d) combusting the at least a portion of the reformed and cracked gaseous mixture and second hydrocarbon-containing fuel in the engine to form an exhaust gas; and (e) recycling part of the exhaust gas to step (a).

DETAILED DESCRIPTION OF THE EMBODIMENTS

Figure 1:
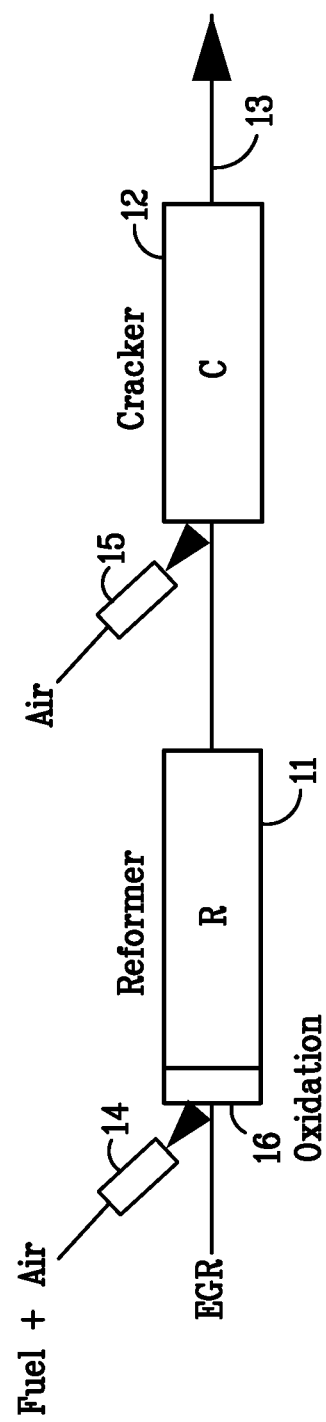
FIG. 1 is a schematic illustration of part of a vehicle power system according to one example of the invention.

Described herein is a power system, particularly a vehicle power system, comprising an engine, such as an internal combustion engine, configured to combust an air/fuel mixture and produce a flow of exhaust gas, an exhaust passageway fluidly connected to the engine to receive the flow of exhaust gas, and an exhaust gas recirculation loop fluidly connecting the exhaust passageway to a fuel intake for the engine. Such a power system is, of course, entirely conventional but, in the system described herein, a first conversion zone containing a fuel reforming catalyst is located within the exhaust gas recirculation loop and a second conversion zone separate from and downstream of the first conversion zone stream is also located within the exhaust gas recirculation loop, the second conversion zone containing a fuel cracking catalyst.

By separating the reforming and cracking functions of the catalytic converter, the operations of the reforming and cracking catalysts can be independently controlled both during normal operation and regeneration so as to maximize their efficiency. In particular, operating the power system described herein comprises supplying a mixture comprising exhaust gas and a first hydrocarbon-containing fuel to the first conversion zone at a first temperature to convert a portion of the fuel in the presence of the reforming catalyst into CO and $H_2$ to produce a reformed gaseous mixture. The reformed mixture is then supplied to the second conversion zone at a second temperature lower than the first temperature to convert paraffins in a further portion of the fuel in the presence of the cracking catalyst into olefins to produce a reformed and cracked gaseous mixture. At least a portion of the reformed and cracked mixture and a second hydrocarbon-containing fuel, which may be the same or different from the first hydrocarbon-containing fuel, is then introduced into the engine where they are combusted to form an exhaust gas. Part of the the exhaust gas is then recycled to the first conversion zone.

As used herein, the term "fuel reforming catalyst" means any catalytic material capable of converting hydrocarbons present in fuel in the presence of steam into carbon monoxide, hydrogen and other useful materials, for example benzene. The term "fuel cracking catalyst" means any catalytic material capable of converting saturated hydrocarbons present in fuel to lower molecular weight, unsaturated hydrocarbons and hydrogen. It will be appreciated that a fuel reforming catalyst may be capable of catalyzing some cracking reactions and similarly a cracking catalyst may be capable of catalyzing some steam reforming reactions. However, in general, the catalyst used in the first conversion zone is chosen for its selectivity towards steam reforming of fuel hydrocarbons and is different from the the catalyst used in the second conversion zone, which is chosen for its selectivity towards dehydrocracking of fuel hydrocarbons.

Fuel Reforming Catalyst

In various aspects, the fuel reforming catalyst can include at least a metal catalyst (or metal-containing catalyst) suitable for reforming of hydrocarbons or hydrocarbon-like compounds. Often the reforming catalyst can further include one or more metal oxide components that act as a support for at least a portion of the metal catalyst. The catalyst composition can optionally further include one or more molecular sieves, such as a CHA framework type molecular sieve (or another small pore molecular sieve) to provide improved methanation activity. In this respect, methanation is a reaction which converts $H_2$ and CO to methane and water and is effectively the reverse of the reaction for steam reforming of methane. Methanation is an exothermic reaction and hence can be used to sustain the reformer temperatures for the syngas producing endothermic reforming reaction, such that relatively little or no other heat may need to be added to the reformer to sustain the reforming reaction.

The at least one metal or metal-containing compound used in the fuel reforming catalyst may be selected from the group consisting of Co, Ru, Rh, Pt, Pd, Fe, Ni, Ir, Zn, Re, and mixtures thereof, with Rh being particularly preferred. It will be understood that reference to the presence of such metals envisions their presence in elemental/and or compound form. Thus, amounts of such compounds refer to the total amount of metal, in the form of metal or in compound form, based on the total weight of the catalyst composition. The amount of metal in the reforming catalyst may range from about 0.1 wt % to about 10 wt %, such as from about 0.5 wt % to about 5 wt %, based on the total weight of the catalyst composition.

The one or more metal oxide components of the fuel reforming catalyst may be selected from any refractory metal oxide(s). Exemplary metal oxides can include, but are not necessarily limited to, aluminum oxides (e.g., $Al_2O_3$, including $O-Al_2O_3$ and/or $\gamma-Al_2O_3$), silicon oxides, titanium oxides, zirconium oxides, hafnium oxides, and rare-earth metal oxides, such as $Y_2O_3$, $Sc_2O_3$, $La_2O_3$, $CeO_2$, $Pr_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and mixtures thereof. In some aspects, the amount of metal oxide(s) in the reforming catalyst may range from about 1 wt % to about 99.9 wt %, such as from about 10 wt % to about 99 wt %, based on the total weight of the catalyst composition.

In certain embodiments, the reforming and optional methanation catalyst can be provided in the first conversion zone in the form of a washcoated monolithic converter. This type of catalyst embodiment for providing a supported catalyst is commonly used for automotive converters. In such embodiments, the catalyst composition can be deposited on or otherwise supported on a flow through substrate with parallel or tortuous channels. The reactive gases can enter a plurality of channels at the front end of the converter and exit the same channels at the rear end of the converter. In certain embodiments used, for example, for particulate filtration on diesel engines, half of the channels of the monolith can be plugged on the inlet side of the monolith and the alternate half of the channels can be plugged on the outlet side of the substrate. In this so-called wall flow substrate, the exhaust can enter the portion of the channel system that is open on the inlet side. At least a portion of the exhaust can then pass through the walls of the porous substrate and exit the substrate through the other half of the channel system. The monolith substrate can be made of, for example, ceramic or metal. Ceramic substrate materials include cordierite, SiC, alumina, titania and other oxides or mixtures of oxides. The catalyst can typically be supported on the substrate in the form of a washcoat. An example of the preparation and application of washcoats for monolithic catalysts is described in the literature "Catalytic Air Pollution" by Ronald M. Heck and Robert J. Farrauto published by Van Nostrand Reinhold, 1995. The preparation of a monolith substrate typically includes the preparation of a slurry containing the catalyst powder and typically a binder material suspended in a liquid phase. The catalyst containing slurry can then be washcoated onto the substrate. The washcoated substrate can then be subsequently dried and calcined in air or annealed in specified gas environments.

Fuel Cracking Catalyst

The fuel cracking catalyst, which is different and located separately from the fuel reforming catalyst, generally comprises one or more molecular sieves, such as one or more zeolites that provide cracking activity, optionally together with a dehydrogenation metal. Any convenient molecular sieve with cracking activity can be used. For example, a molecular sieve with cracking activity such as ZSM-5 or MCM-68 can be beneficial in some catalyst compositions. Other suitable molecular sieves can include medium pore and/or large pore molecular sieves. In some alternative embodiments, instead of including an aluminosilicate type molecular sieve to provide cracking activity, a silicoaluminophosphate molecular sieve or an aluminophosphate molecular sieve can be included in the catalyst composition.

In certain embodiments, the one or more molecular sieve(s) of the fuel cracking catalyst can correspond to at least one medium pore aluminosilicate zeolite having a Constraint Index of 1-12 (as defined in U.S. Pat. No. 4,016,218). Suitable zeolites can include zeolites having an MFI or MEL framework, such as ZSM-5 or ZSM-11. ZSM-5 is described in detail in U.S. Pat. No. 3,702,886 and RE 29,948. ZSM-11 is described in detail in U.S. Pat. No. 3,709,979. Preferably, the zeolite is ZSM-5. Other useful medium pore molecular sieves can include ZSM-12 (U.S. Pat. No. 3,832,449); ZSM-22 (U.S. Pat. No. 4,556,477); ZSM-23 (U.S. Pat. No. 4,076,842); ZSM-34 (U.S. Pat. No. 4,086,186) ZSM-35 (U.S. Pat. No. 4,016,245); ZSM-48 (U.S. Pat. No. 4,397,827); and ZSM-57 (U.S. Pat. No. 4,873,067). Non-limiting examples of SAPO and AlPO molecular sieves can include one or a combination of SAPO-11, SAPO-31, SAPO-41, AlPO-11, AlPO-31, AlPO-41, and PST-6. The molecular sieve(s) can additionally or alternatively comprise or be at least one large pore aluminosilicate, aluminophosphate, or silicoaluminophosphate zeolite containing 12-ring pores. Suitable large pore molecular sieves can include those having AFI, AFS, ATO, ATS, *BEA, BEC, BOG, BPH, CAN, CON, EMT, EON, EZT, FAU, GME, GON, IFR, ISV, -*ITN, IWR, IWW, LTL, MAZ, MEI, MOR, MOZ, MSE, MTW, OFF, OKO, OSI, SAF, SAO, SEW, SFE, SFO, SSF, SSY, and USI frameworks. Preferably, the zeolite is MCM-68 (MSE structure type).

Generally, a zeolite having the desired activity for use in the fuel cracking catalyst can have a silicon to aluminum molar ratio of about 1 to about 50, such as about 5 to about 30 or about 10 to about 20. The silicon to aluminum molar ratio of MCM-68 is generally about 10.

Additionally, the fuel cracking catalyst can include and/or be enhanced by a transition metal. The transition metal can be incorporated into the zeolite by any convenient method, such as by impregnation or by ion exchange. If the transition metal is added to the molecular sieve(s) prior to incorporating the molecular sieve(s) into the catalyst composition, the amount of transition metal can be expressed as a weight percentage of the one or more molecular sieves, such as having at least about 0.1 wt % of transition metal, or at least about 0.25 wt %, or at least about 0.5 wt %, or at least about 0.75 wt %, or at least about 1.0 wt %. Additionally or alternately, the amount of transition metal can be about 20 wt % or less, such as about 10 wt % or less, or about 5 wt % or less, or about 2.0 wt % or less, or about 1.5 wt % or less, or about 1.2 wt % or less, or about 1.1 wt % or less, or about 1.0 wt % or less. Suitable transition metals include Co, Ru, Rh, Pt, Pd, Fe, Ga, Ni, Ir, Zn, Re, and mixtures thereof.

In some embodiments, where the fuel reforming catalyst contains rhodium, the weight ratio of the fuel cracking catalyst (molecular sieve plus transition metal) to the rhodium on the fuel reforming catalyst is at least 20, preferably at least 200, more preferably at least 250.

Optional Oxidation Catalyst

In some embodiments, the catalytic conversion system further comprises a pre-combustion catalyst located within the exhaust gas recirculation loop upstream of the fuel reforming catalyst for raising the temperature of the exhaust gas by catalytic partial oxidation of fuel. Suitable pre-combustion catalysts comprise Pt group metals (especially Pt, Pd, and Rh) preferably supported on various type and shape of ceramic monolith, metallic monolith, pellet, wire mesh, screen, foam, plate etc. Where present, the pre-combustion catalyst is conveniently located at or adjacent the inlet to the first conversion zone.

Optional Air Injection

Each of the first and second conversion zones may be provided with separate and independently operated air injectors to allow independent temperature control of their respective catalysts. In particular, where the first conversion zone comprises a pre-combustion catalyst located upstream of the fuel reforming catalyst, the air injection rate to the pre-combustion catalyst can be adjusted to control the fraction of fuel that is oxidized prior to entering the reforming catalyst, to achieve both a target inlet temperature to the reforming catalyst stage and a positive heating value gain. This adjustment is typically made in response to the varying EGR temperature over different engine loads. Heating value gain is defined as the lower heating value (LHV) of the stream exiting the converter minus the LHV of the stream entering the converter, whereas LHV is defined as the heating value obtained by subtracting the latent heat of vaporization of water vapor formed during combustion from the gross heating value. The gross or higher heating value is the amount of heat produced on complete combustion of a unit quantity of fuel, when all products, including water vapor are cooled down to the initial temperature The air injection rate to the second conversion zone is adjusted to achieve a target inlet temperature to the cracking catalyst that is sufficient to effect the desired fuel cracking but no higher than the maximum temperature to avoid damaging the cracking catalyst.

Operation of the Fuel Converter

In operation, the two-stage fuel converter is periodically cycled between a fuel upgrading mode and a regeneration mode.

In the fuel upgrading mode, a gaseous stream comprising all or at least a majority of fuel to be used by the engine, air, and exhaust gas is supplied to the first conversion zone such that the stream is fuel rich with respect to combustion stoichiometry. The air injection rate to the pre-combustion catalyst is adjusted so that the gas steam at the inlet to the reforming catalyst is at a first temperature, typically greater than 550° C. and less than 700° C., such as 600 to 680° C., effective to convert a portion of the fuel in the presence of the reforming catalyst into CO and $H_2$ and produce a reformed gaseous mixture. The reformed gaseous mixture is then supplied to the second conversion zone, which is at a second temperature lower than the first temperature, typically from 500 to 550° C., effective to convert paraffins in a further portion of the fuel into olefins to produce a reformed and cracked gaseous mixture. The reformed and cracked gaseous mixture, optionally together with additional hydrocarbon-containing fuel is then introduced into the engine, where the fuel is combusted to generate power and produce exhaust gas. Part of the exhaust gas is then recycled to the first conversion zone.

During the fuel upgrading mode, the reforming catalyst, and to a lesser extent the cracking catalyst, lose activity due to the deposition of coke and sulfur compounds on the catalysts. Thus after a predetermined time, t1, in the fuel upgrading mode, the converter is switched to the regeneration mode, in which the inlet stream to the converter comprises a minor amount of fuel, air, and exhaust gas such that the stream is air rich with respect to combustion. During the regeneration mode the air injection rates to the first and second conversion zones are adjusted independently such that the coke and sulfur are burned off the catalysts to return the activity of the catalysts towards their initial values. Typically, the temperature at the inlet to the first conversion zone is adjusted to about 700° C. during regeneration and the temperature at the inlet to the second conversion is adjusted to about 500° C. After a predetermined time, t2, the system is cycled back to the fuel upgrading mode. In some embodiments, the ratio of t1:t2 is at least 5, preferably at least 9. Preferably, t2 is less than or equal to 10 minutes.

Using the two-stage fuel conversion system described herein, the reformed and cracked gaseous mixture exiting the second conversion zone during fuel upgrading cycles is found to have a higher octane number and LHV than the mixture supplied to the first conversion zone.

One embodiment of a vehicle power system including the two stage fuel converter described herein is shown in FIG. 1. The converter comprises an upstream first conversion zone 11 housing a reforming catalyst and a downstream second conversion zone 12 housing a dehydrocracking catalyst, each of the zones 11, 12 being located in the exhaust gas recirculation (EGR) line 13 of the vehicle engine (not shown). A first air injector 14 is positioned in the EGR line 13 in front of the first conversion zone 11 and a second air injector 15 is positioned in the EGR line 13 between the first and second conversion zones 11, 12. Optionally the converter may contain an oxidation catalyst 16 upstream of the reforming catalyst.

Two operating modes of the converter shown in FIG. 1 can be distinguished: 1) fuel upgrading and 2) converter regeneration. During the fuel upgrading mode, raw fuel is injected upstream of the reforming catalyst. A metered amount of air can be injected through the first air injector 14 so as to achieve precombustion of a portion of the injected fuel over the oxidation or reformer catalyst. The exotherm from the fuel pre-combustion process is used to drive the endothermic reforming and dehydrocracking reactions. In one operation mode, the target reformer inlet/oxidation catalyst outlet temperature is about 700° C. The temperature in the first conversion zone 11 decreases due to the endothermic steam reforming reactions such that the reformer outlet temperature is between about 550° C. and about 600° C. The reformed EGR/fuel mixture then enters the second conversion zone 12 where the temperature drops further to about 450° C. to 500° C. due to the endothermic dehydrocracking reactions.

Periodically, the converter needs to be regenerated from coke and sulfur. During the converter regeneration the amount of fuel and air injected upstream of the reformer catalyst are controlled so as to generate a lean EGR gas mixture containing about 5% $O_2$ and a reformer inlet temperature of about 700° C. The $O_2$ oxidizes coke deposits on the reformer and dehydrocracking catalysts. In order to prevent overheating of the dehydrocracking catalyst and to accelerate the coke combustion over the dehydrocracking catalyst, an additional amount of air can be injected through the second air injector 15 in front of the dehydrocracking catalyst.

The invention will now be more particularly described with reference to the following non-limiting Examples and FIGS. 2 to 10 of the accompanying drawings.

Catalysts and Catalyst Preparation

The catalysts used in the following Examples are listed in Table 1.

TABLE 1

| Catalyst | Description | Function |
| --- | --- | --- |
| A | 3.5% Rh-LACZ | Reforming |
| B | 0.95% Rh—SiAl | Reforming |
| C | 1.53% Rh—Na-CHA | Reforming/methanation |
| D | 1.13% Rh—H-CHA | Reforming/methanation |
| E | 1.48% Rh—H-CHA | Reforming/methanation |
| F | 1.1% Zn-MCM-68 | Dehydrocracking |
| G | 0.52% Pt1.0% Zn-MCM-68 | Dehydrocracking |

Catalyst A

Catalyst A comprises 3.5 wt % Rh supported on a mixed metal oxide comprising $La_2O_3$-$\gamma$-$Al_2O_3$(36.5 wt % of total) and $CeO_2$—$ZrO_2$ (60 wt % of total). The $La_2O_3$-$Al_2O_3$ support was prepared separately by impregnation of an aqueous La(NO$_3$)$_3$ solution onto γ-Al$_2$O$_3$ followed by drying and calcination at 600° C. CeO$_2$—ZrO$_2$ was co-precipitated from an aqueous Ce(NO$_3$)$_4$ and Zr(NO$_3$)$_4$ solution onto the La$_2$O$_3$—Al$_2$O$_3$ support using urea as base. The Ce:Zr atomic ratio is 4:1. The La$_2$O$_3$-γ-Al$_2$O$_3$—CeO$_2$—ZrO$_2$ support was calcined at 600° C. prior to incipient wetness impregnation with an aqueous solution containing Rh(NO$_3$)$_3$. After the precious metal impregnation the catalyst was calcined in air at 600° C.

Catalyst B

Catalyst B comprises Rh supported on a mixed metal oxide comprising silica and alumina. To produce the catalyst, 5 g of previously steamed (24 h, 700° C., 2000 sccm air, 60% steam) Siral 40 silica/alumina was impregnated with a solution of 0.497 g of rhodium nitrate and 8.1 g in deionized water. Afterwards the catalyst was dried for 4 h at ambient conditions, and then for 16 h at 121° C./250° F. Finally, all of the catalyst was calcined in air (5 L/min) at 600° C. for 4 h, with a 2.5 h heating ramp. XRF elemental analysis gave Rh=0.95%.

Catalyst C

Catalyst C comprises Rh supported on the zeolite, chabazite (CHA). To produce the catalyst, a synthesis mixture was prepared having the stoichiometry: 0.2 Rh: 2.15 SDAOH: 7 Na$_2$O:Al$_2$O$_3$: 25 SiO$_2$: 715 H$_2$O, where SDAOH is N,N,N-trimethyladamantammonium hydroxide. To each of two 125 ml Teflon liners were added 20.7 g sodium silicate (EMD—28.2% SiO$_2$, 9.3% Na$_2$O), 37.8 g deionized water, 0.5 g 50% NaOH, and 8.8 g 25% SDAOH. The mixture was stirred with a magnetic stirrer and then 4.14 g of 10 wt. % Rh(en)$_3$Cl$_3$.3H$_2$O solution (en=ethylenediamine) solution was added drop wise with stirring and then stirred until homogenous. Then 2.83 g of USY (60 wt. % SiO$_2$, 17 wt. % Al$_2$O$_3$) zeolite was mixed in each liner. The autoclaves were heated for 6 days at 140° C. in a tumbling oven at 25 rpm. The product was recovered by vacuum filtration and washed with de-ionized water. Phase analysis by powder X-ray diffraction showed that the sample was pure chabazite. The sample was finally calcined in air for 3 hr. at 560° C. at a temperature ramp of 4.5° C./min. Analysis by X-ray fluorescence showed the sample contained 1.31 wt. % Rh. Elemental analysis gave Si/Al=7.3, Na/Al=0.46 and Rh=1.53 wt %. SEM showed that the crystals were 0.1 μm in size.

Catalyst D

Catalyst D also comprises Rh supported on CHA. Catalyst D was prepared using the same recipe as Catalyst C except that the crystallization time was 7 days. The sample was then ammonium exchanged as follows: A 2 g portion of the calcined sample was subjected to NH$_4^+$ exchange by stirring with 22 g of 10 wt % NH$_4$NO$_3$ solution at 60-80° C. for 1 hr and then washing with de-ionized H$_2$O. The exchange was repeated again and then, after drying at 115° C., it was calcined for 3 hrs. at 350° C. and the exchange was repeated a second time. After ammonium exchange, elemental analysis gave Si/Al=7.1, Na/Al=0.006 and Rh=1.13 wt %. SEM showed that the crystals were 0.05-0.3 μm in size.

Catalyst E

Catalyst E also comprises Rh supported on CHA. Catalyst E was prepared by ammonium ion exchange of catalyst C in the same way as described above: A 2 g portion of the calcined sample of catalyst C was subjected to NH$_4^+$ exchange by stirring with 22 g of 10 wt % NH$_4$NO$_3$ solution at 60-80° C. for 1 hr and then washing with de-ionized H$_2$O. The exchange was repeated again and then, after drying at 115° C., it was calcined for 3 hrs. at 350° C. and the exchange was repeated a second time. Elemental analysis gave Si/Al=7.3, Na/Al=0.01 and Rh=1.48 wt %.

Catalyst F

Catalyst F comprises Zn supported on the zeolite, H-MCM-68. The zeolite support was synthesized according to the methods described in U.S. Patent Application Publication No. 2014/0140921, the portions of which related to synthesis of MCM-68 being incorporated herein by reference. The acid form of the zeolite was prepared by pre-calcining the MCM-68 crystal at ~400° C. under nitrogen flow for 30 minutes, switching the purge gas from nitrogen to air while increasing the temperature to ~600° C., and holding at ~600° C. under flowing air for 2 hours. The precalcined material was then exchanged three times with NH$_4$NO$_3$ at ~98° C. Between each exchange and at the completion of the three exchanges, the MCM-68 crystal was exhaustively washed with water and then dried at ~120° C. After exchanging the crystal for the first time, the ammonium form was calcined at ~500° C. in air for ~2 hours, subsequently steamed for ~6 hours at ~538° C. The steamed MCM-68 crystal was subsequently exchanged three more times as described previously for the pre-calcined powder. Finally, the ammonium exchanged material was calcined at ~500° C. in air for ~2 hours to create the acid form of the zeolite. The Si/Al ratio was about ~10.5 g of MCM-68 in the H-form was subsequently impregnated with a solution of 0.23 g zinc nitrate hexahydrate (98%) in 4.1 g deionized water. Afterwards the catalyst was dried for 4 h at ambient conditions, and then for 16 h at 121° C./250° F. Finally, all of the catalyst was calcined in air (5 L/min) at 500° C. for 4 h, with a 2.5 h heating ramp. XRF elemental analysis gave Zn=1.1 wt %.

Catalyst G

Catalyst G comprises Pt and Zn supported on H-MCM-68. To prepare catalyst G, 5 g of catalyst F (1.1% Zn-MCM-68) was impregnated with a solution of 0.6868 g platinum nitrate solution (3.64 wt. % Pt) and 3.75 g deionized water. Afterwards the catalyst was dried for 4 h at ambient conditions, and then for 16 h at 121° C. Finally, all of the catalyst was calcined in air (5 L/min) at 350° C. for 3 h, with a 9.5 h heating ramp. XRF elemental analysis gave Pt=0.52% and Zn=1.03%.

Testing with Sulfur Fuel

Tests were conducted in a quartz reactor at 1.3 bar pressure. The simulated EGR/fuel feed gas contained 10.24 mol % fuel of a simulated hydrocarbon fuel, 26.6 mol % CO$_2$, 27.4 mol % H$_2$O, 0.6 vol ppm H$_2$S, balance N$_2$. Reaction products CO, CO$_2$, and H$_2$ were analysed by GC-TCD while hydrocarbons were analysed by GC-TCD. Reaction products were categorized in reforming products CO, CO$_2$, and H$_2$, cracked products were grouped into C2-C4 olefins and paraffins and methane. The conversion of individual fuel components was calculated according to the following equation:

$$\text{Conversion} = \frac{\left\{[F]_i^{in} - [F]_i^{out} \cdot \frac{[N_2]^{in}}{[N_2]_i^{out}}\right\} \cdot C_{F,i}}{\sum_i [F]_i^{in} \cdot C_{F,i}}$$

where

[N$_2$]$^{in}$: Concentration of N$_2$ at reactor inlet (mol/l)
[N$_2$]$^{out}$: Concentration of N$_2$ at reactor outlet (mol/l)
[F]$_i^{in}$: Concentration of fuel component i at reactor inlet (mol/l)

$[F]_i^{out}$: Concentration of fuel component i at reactor inlet (mol/l)

$C_{F,i}$: Carbon number of fuel component i.

Carbon product selectivity was defined as follows:

$$\text{Selectivity} = \frac{[P_i]^{out} \cdot C_{P,i} \cdot \frac{[N_2]^{in}}{[N_2]^{out}}}{\sum_i [F]_i^{in} \cdot C_{F,i}}$$

$CO_x$ selectivity was defined as follows:

$$CO_x \text{selectivity} = \frac{\{[CO]^{out} + [CO_2]^{out}\} \cdot \frac{[N_2]^{in}}{[N_2]^{out}} - [CO_2]^{in}}{\sum_i [F]_i^{in} \cdot C_{F,i}}$$

where

[CO]$^{out}$: Concentration of $CO_2$ at reactor outlet (mol/l)
[CO]$^{in}$: Concentration of $CO_2$ at reactor inlet (mol/l)
[CO]$^{out}$: Concentration of CO at reactor outlet (mol/l)
$[P]_i^{out}$: Concentration of product i at reactor outlet (mol/l)

The reforming and dehydrocracking catalysts were tested together in a stacked bed configuration. Catalysts were run on a sequence of reforming/regeneration cycles as specified in the Examples.

Example 1

A test was conducted with a catalyst system that contained the two reforming catalysts A and D physically mixed and placed upstream, and the dehydrocracking catalyst F (1% Zn-MCM-68) placed downstream. The weight ratio of catalysts A:D:F was 1:2.3:2 resulting in equal amounts of Rh supported on the LACZ support of catalyst A and the CHA support of catalyst D, respectively. The converter system was operated at a uniform furnace set temperature of 500° C. The converter was operated on cycles of 3 hours reforming with the simulated EGR/fuel feed gas described above followed by 30 min regeneration in 5% 02, 34% $H_2O$ balance $N_2$. The space velocity was 0.53 g fuel/s/1 g Rh/28 g catalyst F. The fuel was a blend of 33.3 vol % n-heptane (n-C7), 33.3 vol % 3-methylpentane (3-MP) and 33.3 vol % 2,2,4-trimethylpentane (iso-C8).

Figure 2:
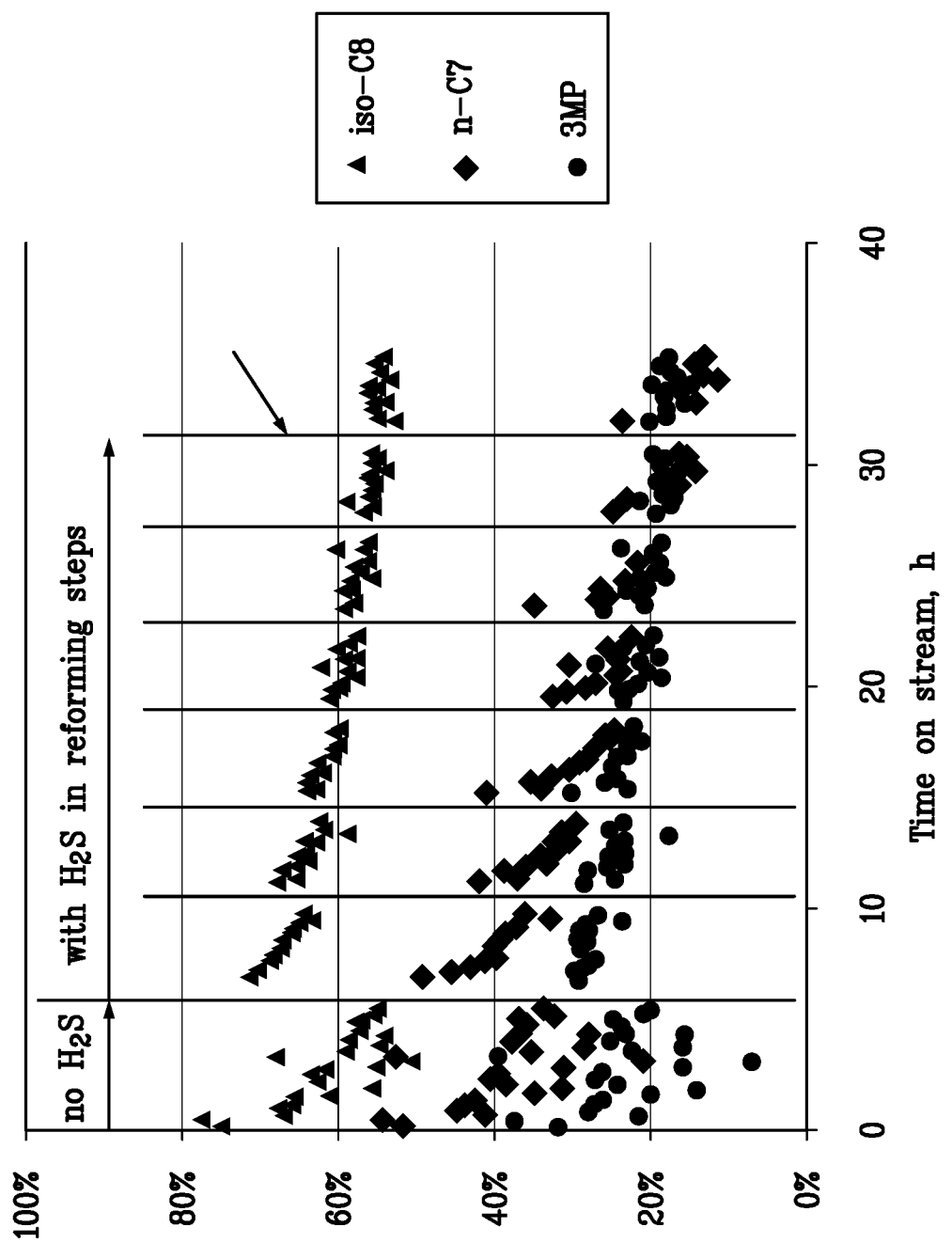
FIG. 2 is a graph of fuel component conversion over time for the reforming/regeneration test of Example 1.

FIG. 2 shows the conversion of the fuel components over the catalyst system as a function of time on stream during the test of Example 1. In the first cycle, no $H_2S$ was included in the simulated EGR/fuel feed gas mixture. Initial catalyst activity was high in the first cycle, but declined during this cycle due to catalyst coking. Regeneration by $O_2$ restored most of the fresh activity. In cycle Nos. 2 to 8, $H_2S$ was was included in the simulated EGR/fuel feed gas mixture and catalyst activity declined continuously with cycle number.

Figure 3:
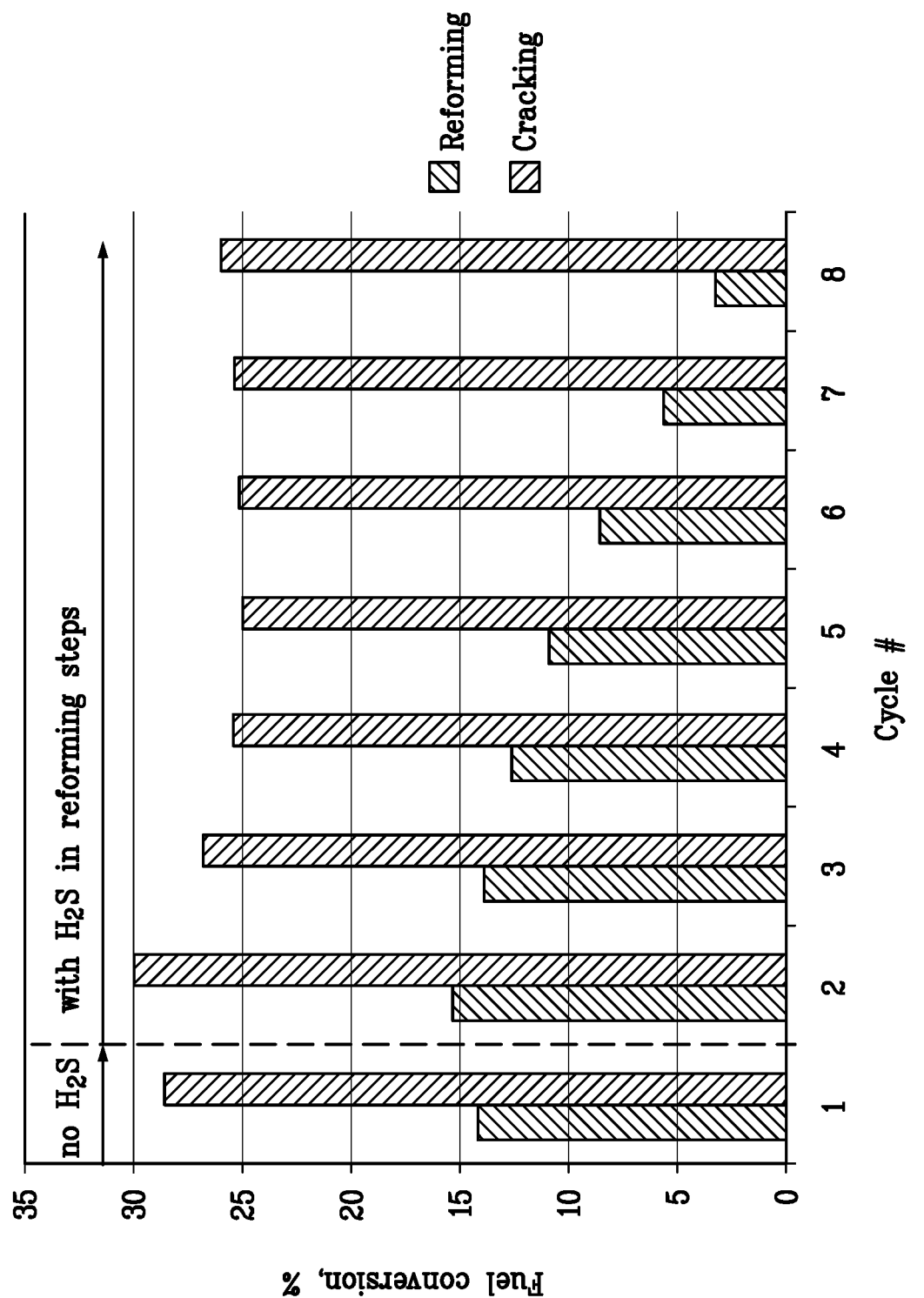
FIG. 3 is a bar graph comparing the fuel conversion by reforming with the fuel conversion by cracking over each cycle of the reforming/regeneration test of Example 1.

FIG. 3 compares conversion of the fuel by reforming with that by cracking during each reforming cycle of Example 1. The individual fuel conversion by reforming and cracking was calculated from the total conversion and the carbon selectivity towards reformed and cracked products, respectively. CO and $CO_2$ were defined as reformed products, while the methane and $C_2$-$C_4$ cracked products were defined as cracked products. It can be seen that reforming activity strongly declined while cracking activity remained almost constant with time on stream.

Figure 4:
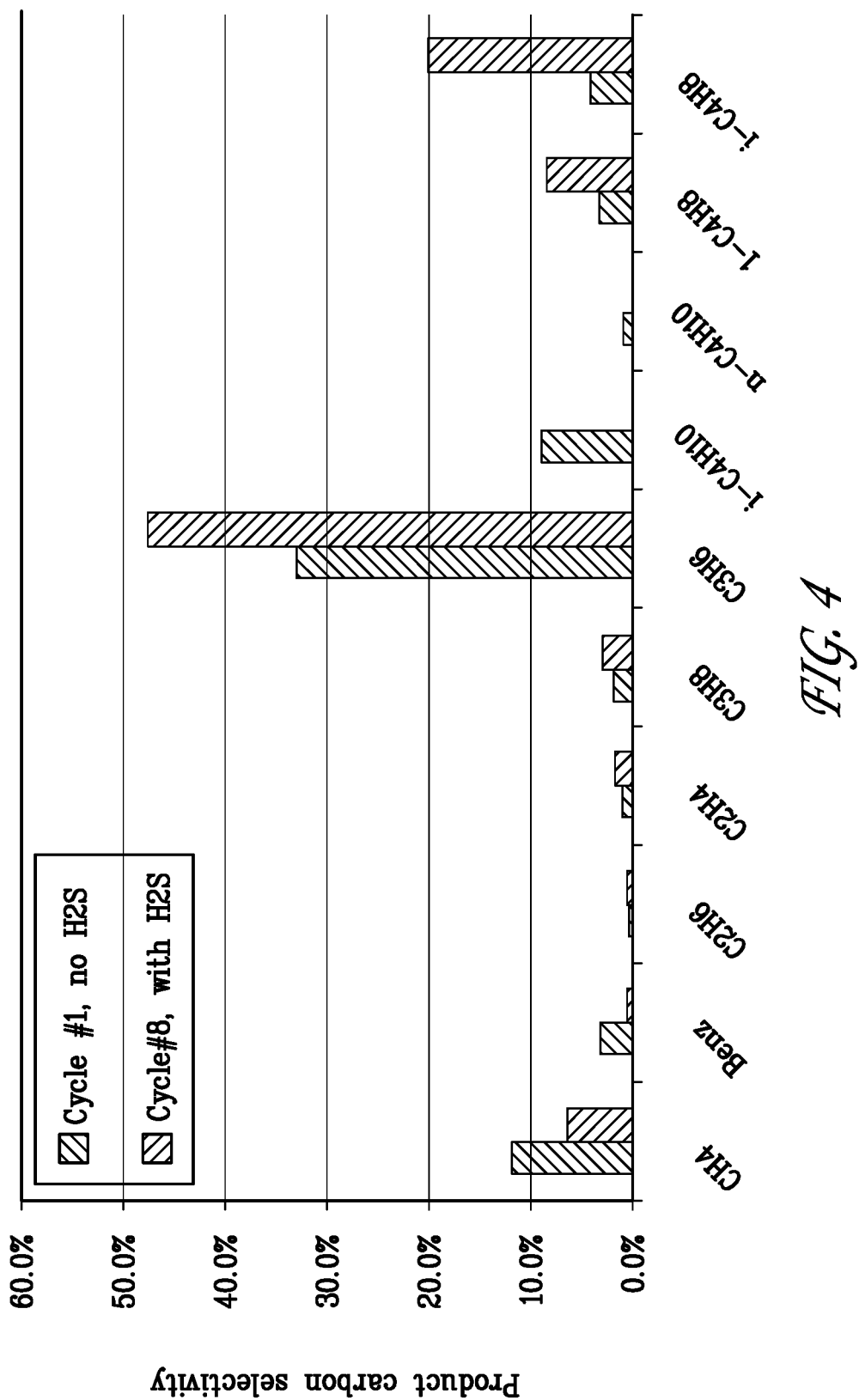
FIG. 4 is a bar graph comparing the carbon product selectivity in hydrocarbon products formed at the beginning and end of the test of Example 1.

FIG. 4 shows the carbon product selectivity in hydrocarbon products formed at the beginning and end of the test of Example 1. Propylene was the major reaction product in the fresh catalyst. In the sulfur aged state (cycle No. 8) propylene and butenes were the main reaction products.

The test results demonstrate that the converter configuration of Example 1 is effective to convert paraffinic fuel into syngas and cracked products. However, periodic catalyst treatments in 5% $O_2$ at 500° C. were not successful in maintaining the activity of the catalyst reforming function. The same regeneration conditions were sufficient to maintain the cracking catalyst function over the test period.

Example 2

A test was conducted with a catalyst system that contained the two reforming catalysts A and E physically mixed and placed upstream, and the dehydrocracking catalyst G (0.5% Pt1% Zn-MCM-68) placed downstream. The weight ratio of catalysts A:E:G was 1:2.3:2 resulting in equal amounts of Rh supported on the LACZ support of catalyst A and the CHA support of catalyst E, respectively. In order to mimic the temperature profile expected in an adiabatic reactor the furnace was tuned so as to achieve a temperature gradient across the converter. Bed temperatures in the upstream catalyst were between 580° C. and 600° C. while in the downstream dehydrocracking catalyst temperatures between 500° C. and 520° C. were recorded during the fuel conversion periods. For the $O_2$ regenerations, the furnace was operated such that the catalyst bed temperatures were about 600° C. in the reformer bed and about 500° C. in the dehydrocracking catalyst bed during $O_2$ treatments. The catalyst was run on cycles of 3 hours reforming with 0.6 vol ppm of $H_2S$ present, followed by 30 minutes regeneration in a gas stream containing $O_2$, $H_2O$ and $N_2$ without $H_2S$. The concentration of the $O_2$ during the regeneration steps was varied from 15 minutes at 0.5 mol % $O_2$ followed by 15 minutes at 5 mol % 02. The space velocity was 0.46 g fuel/s/1 g Rh/29 g dehydrocracking catalyst. The fuel was a blend of 33.3 vol % n-hexane (n-C6), 33.3 vol % 3-methylpentane (3-MP) and 33.3 vol % 2,2,4-trimethylpentane (iso-C8).

Figure 5:
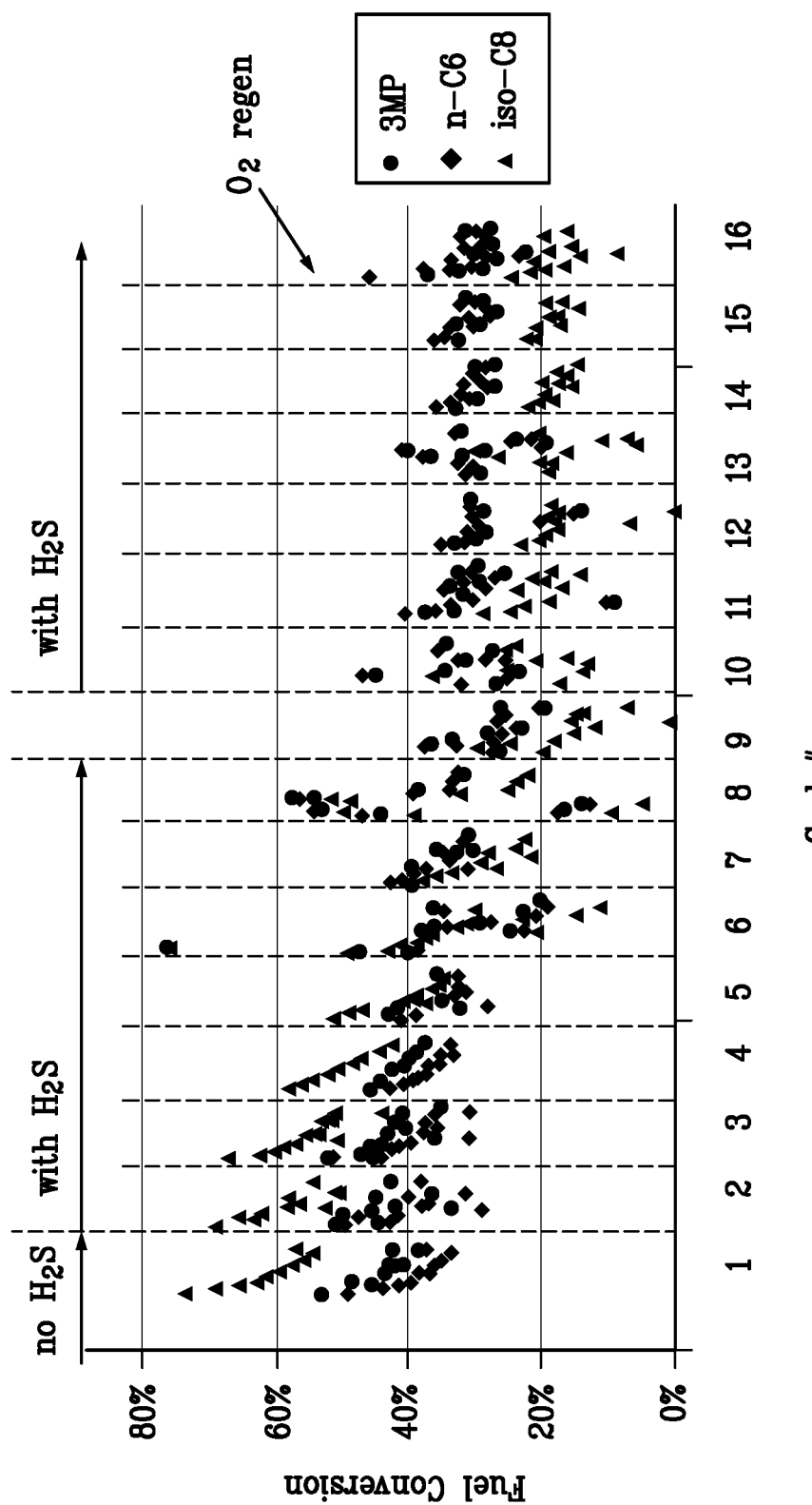
FIG. 5 is a graph of fuel component conversion over time for the reforming/regeneration test of Example 2.

FIG. 5 shows the fuel conversion over the catalyst system as a function of time on stream during the test of Example 2. It can be seen that the converter activity declined with time on stream during the first cycle. The catalyst activity was largely regenerable with $O_2$ as seen from the recovery of fuel conversion at the beginning of the second cycle. $H_2S$ was added to the reforming gas stream in cycle Nos. 2-8 and in cycle Nos 10-16. A stable converter performance was observed in cycles 10-16 in the presence of $H_2S$.

Figure 6:
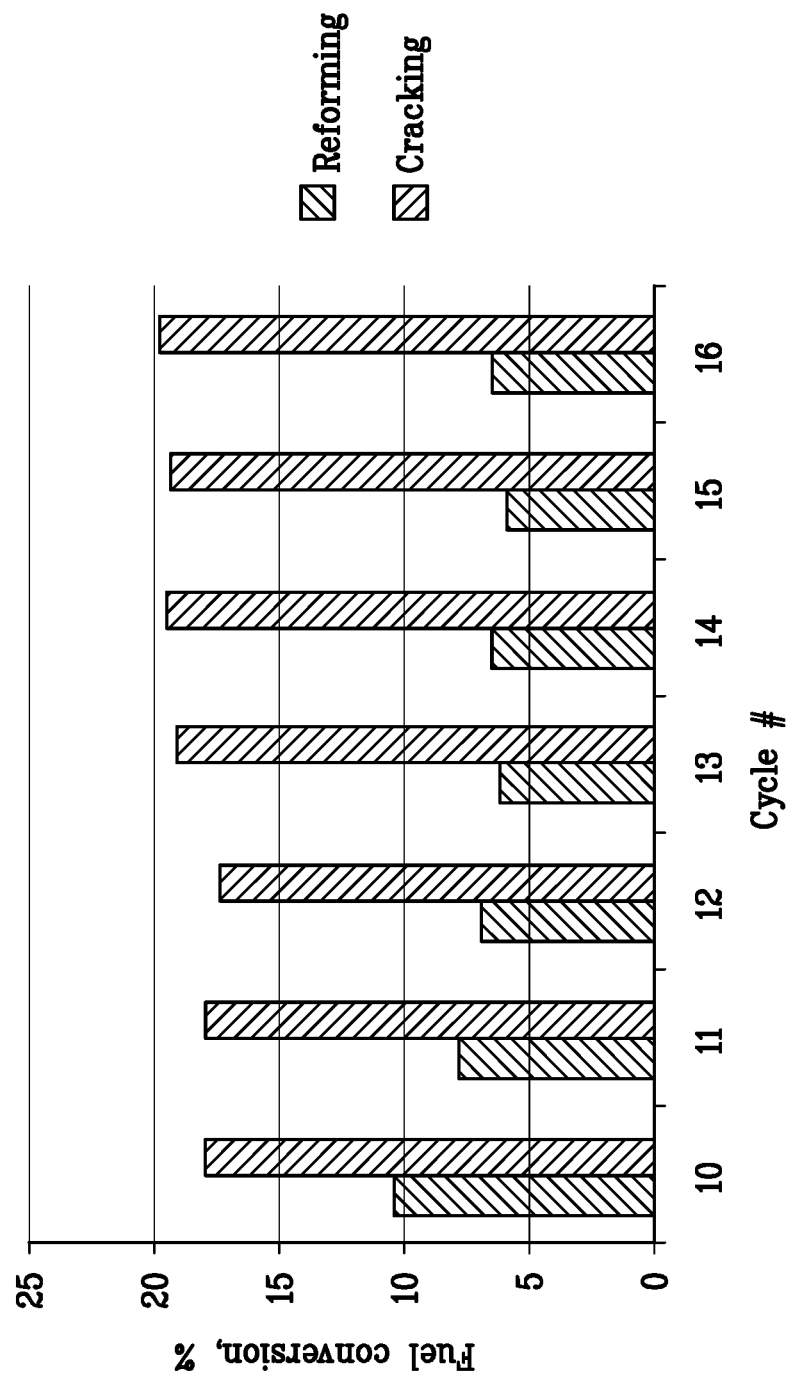
FIG. 6 is a bar graph comparing the fuel conversion by reforming with the fuel conversion by cracking over cycle Nos 10 to 16 of the reforming/regeneration test of Example 2.

FIG. 6 shows the split of fuel converted by reforming (from CO and $CO_2$ formation) and by cracking (from $C_1$-$C_4$ product formation) in Example 2. Fuel conversion by reforming and cracking is stable over the test period in cycles 10-16 with $H_2S$ co-feed during the reforming steps. This demonstrates that $O_2$ regenerations are successful in restoring catalyst activity.

Figure 7:
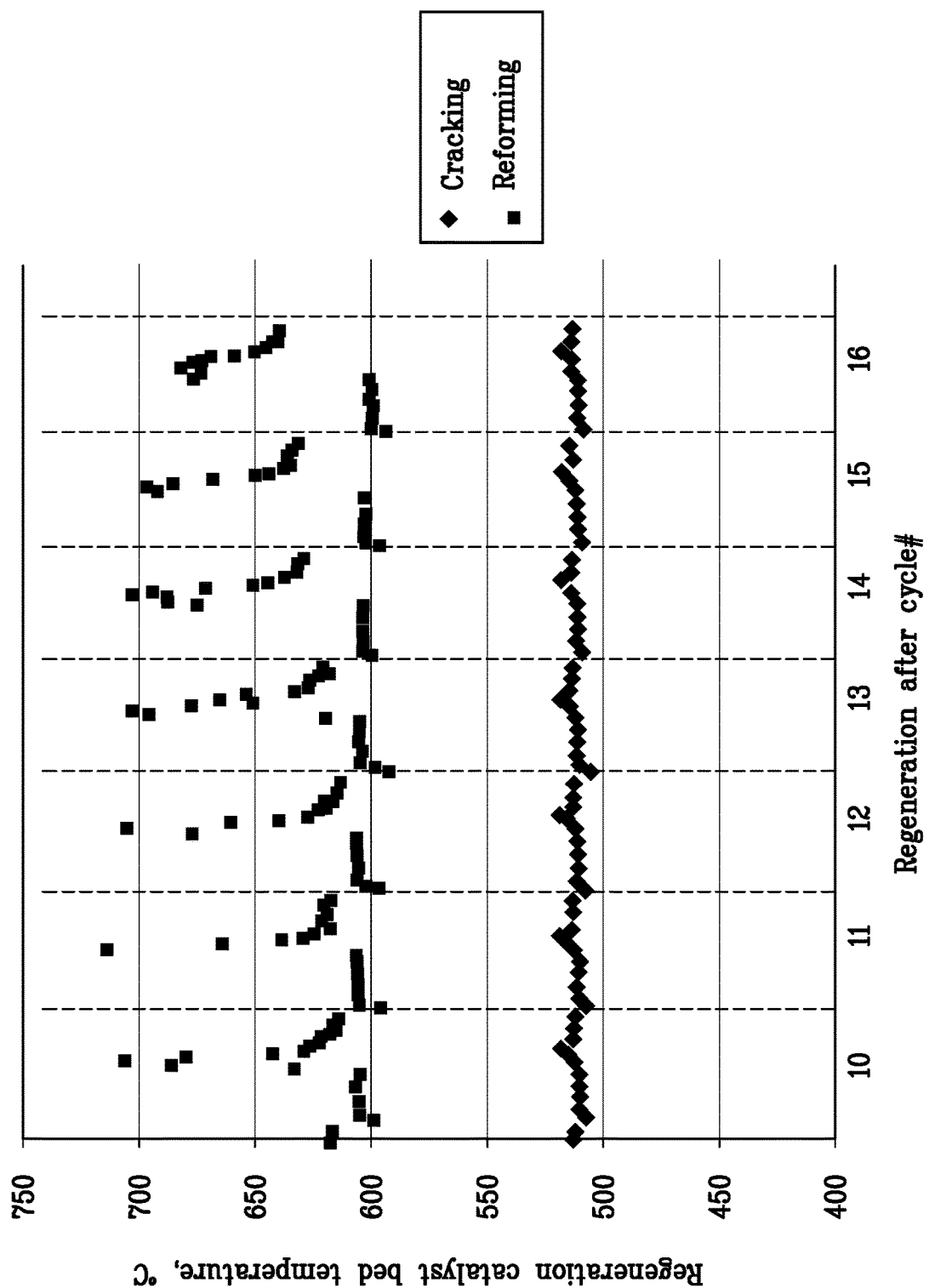
FIG. 7 is a graph showing the catalyst bed temperatures during regeneration in cycle Nos 10 to 16 of the reforming/regeneration test of Example 2.

The catalyst bed temperatures during the regeneration in cycles 10-16 on sulfur fuel are reported in FIG. 7. The reformer bed temperature does not rise during the first phase of the regeneration step when the $O_2$ concentration is only 0.5%, but increases sharply by about 100° C. when the $O_2$ concentration is raised to 5%. The exotherm during the second phase indicates the burn-off of coke, and shows that $O_2$ concentrations above 0.5% are helpful in accomplishing fast catalyst regenerations from coke. Contrary to the reformer, the exotherms detected in the dehydrocracking catalyst bed are rather small and do not change with time on stream.

Example 3

A test was conducted with a catalyst system that contained the two reforming catalysts B and D physically mixed and placed upstream, and the dehydrocracking catalyst G (0.5% Pt1% Zn-MCM-68) placed downstream. The weight ratio of catalysts B:D:G was 1:0.84:1.11 resulting in equal amounts of Rh supported on the SiAl support of catalyst B and the CHA support of catalyst D, respectively. In order to mimic the temperature profile expected in an adiabatic reactor the furnace was tuned so as to achieve a temperature gradient across the converter catalyst. Bed temperatures in the upstream catalyst were between 640° C. and 650° C. while in the downstream dehydrocracking catalyst bed temperatures of about 500° C. were recorded during the fuel conversion periods. The catalyst was run on cycles of 3 hours reforming with 0.6 vol ppm of $H_2S$ present, followed by 30 minute regeneration $O_2$ regeneration without $H_2S$. A two step $O_2$ regeneration step consisting of 15 minutes with 0.5% $O_2$ followed by 15 minutes 5% $O_2$ was applied after sulfur cycles 24, 25, 29, 30 and 31 while a continuous 30 minute 5% $O_2$ regeneration step was applied after sulfur aging cycles 26, 27 and 28 (see FIG. 9). During the 02 regenerations the catalyst bed temperatures were about 680° C. in the reformer bed and about 480° C. in the dehydrocracking catalyst bed. The space velocity was 0.63 g fuel/s/1 g Rh/59 g dehydrocracking catalyst. The fuel was a blend of 33.3 vol % n-hexane (n-C6), 33.3 vol % 3-methylpentane (3-MP) and 33.3 vol % 2,2,4-trimethylpentane (iso-C8).

Prior to the above test sequence, the catalyst was subjected to sulfidation/regeneration cycles at various temperatures. That test period included 12 test cycles where the cracking catalyst was operated at bed temperatures between 600° C. and 700° C. during the reforming steps and about 700° C. during the air regeneration steps.

Figure 8:
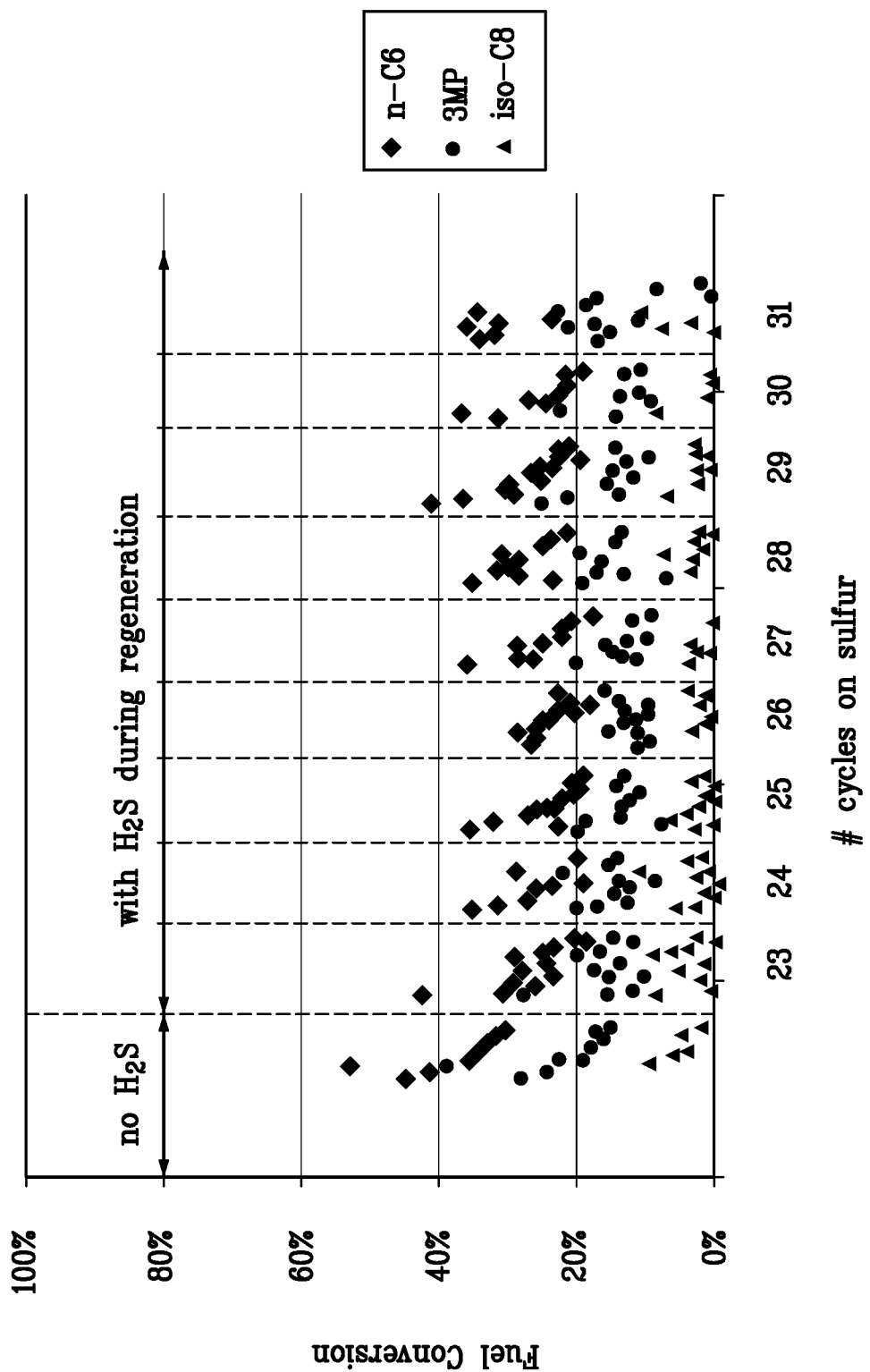
FIG. 8 is a graph of fuel component conversion during the last nine cycles of the reforming/regeneration test of Example 3.

FIG. 8 shows the conversion of n-C6, 3MP and iso-C8 as a function of time on stream during the last 9 cycles of the test run of Example 3. The last 9 cycles, cycle Nos. 23 to 31, were carried out with $H_2S$ in the feed as indicated. The converter bed temperature was between 640° C. and 650° C. in the upstream reformer and about 500° C. in the downstream dehydrocracking catalyst. The catalyst regeneration was carried out at the same furnace set points as the reforming steps. It can be seen that the n-C6 and 3MP conversion declined during each reforming interval, but could be recovered by the $O_2$ regenerations. The iso-octane conversion was minimal indicating that the dehydrocracking catalyst had deactivated during the preceeding high temperature operation.

Figure 9:
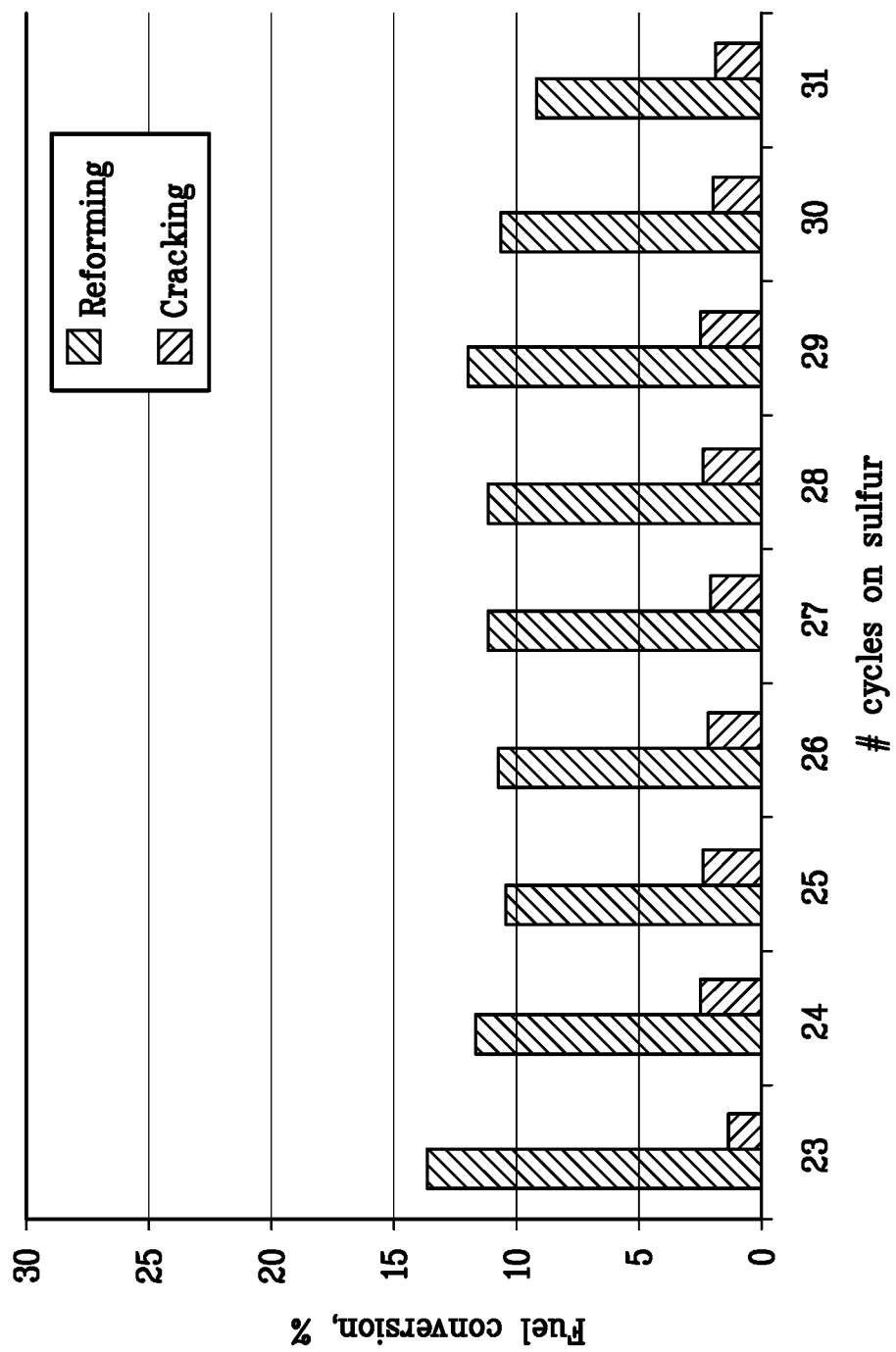
FIG. 9 is a bar graph comparing the fuel conversion by reforming with the fuel conversion by cracking over the last nine cycles of the reforming/regeneration test of Example 3.

FIG. 9 shows the conversion of fuel by cracking and reforming during the last 9 sulfur cycles of the experiment. There was very little fuel converted by cracking in line with the low iso-octane conversion shown in FIG. 8. Fuel conversion by reforming declined in each of the sulfur cycles #23-31 because of catalyst deactivation by coke and sulfur. However $O_2$ regenerations were successful in restoring the activity of the BD reforming catalyst function after each sulfur test cycle.

Figure 10:
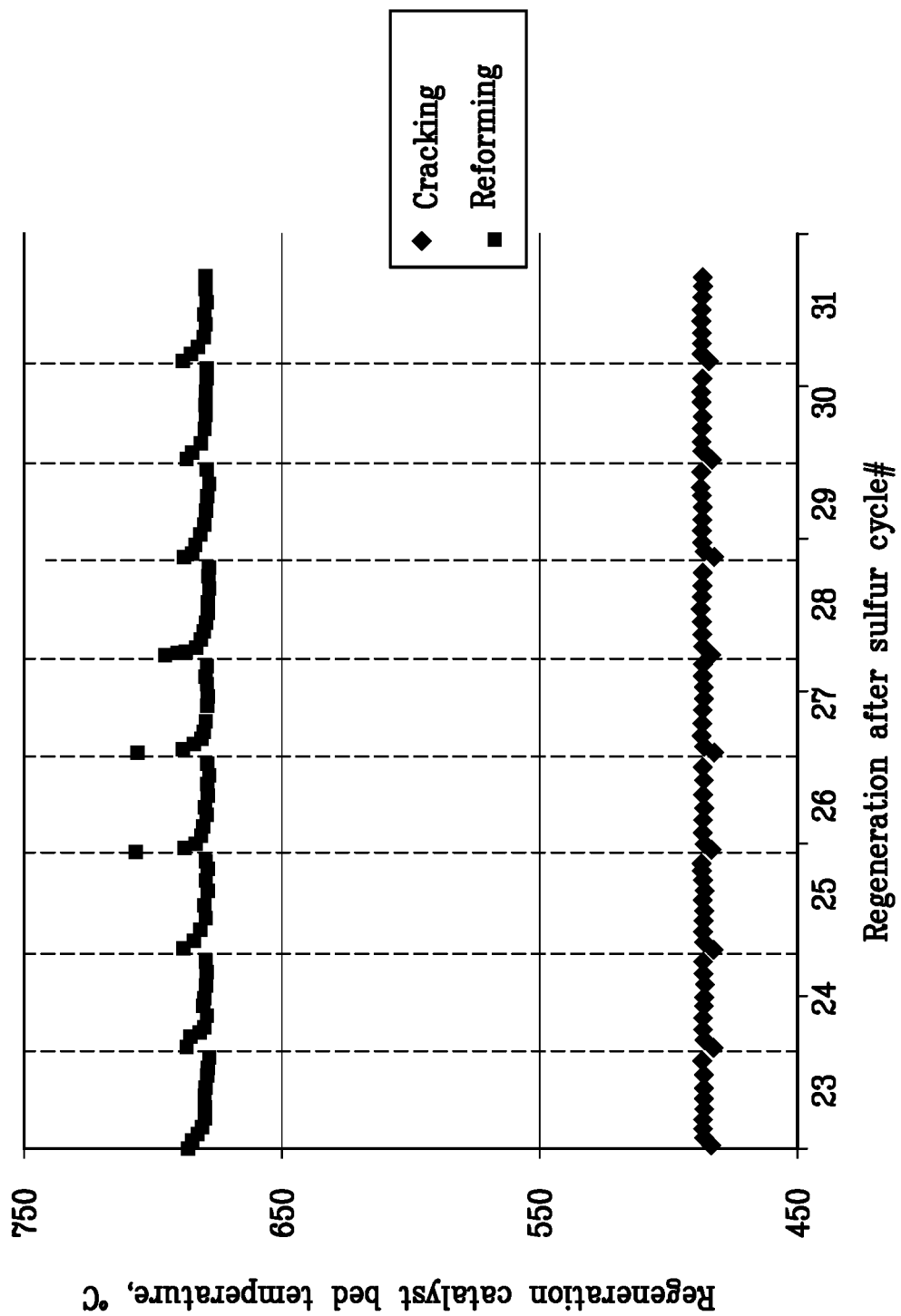
FIG. 10 is a graph showing the catalyst bed temperatures during regeneration in last nine cycles of the reforming/regeneration test of Example 3.

FIG. 10 shows the exotherms measured in the reforming and cracking catalyst beds during the $O_2$ regeneration steps in sulfur cycles #23-31. Exotherms on the order of about 10° C. were measured at the beginning of the $O_2$ regeneration steps. The exotherms generated in Example 3 over the reforming catalyst B+D were much smaller than those generated in Example 2 over reforming catalyst A+E. This was surprising since the reformer catalyst B+D was operated at higher temperature than reformer catalyst A+E. It is known that coke formation increases with temperature and one would have expected larger exotherms during the $O_2$ regeneration of reformer B+D in Example 3. Moreover, the exotherms in Example 3 occurred at the beginning of the 0.5% $O_2$ steps while in Example 3 they occurred only upon introduction of 5% $O_2$. This indicates that catalyst B+D is easier to regenerate than catalyst A+E. No exotherm was observed in the dehydrocracking catalyst in Example 3. This is in agreement with the loss of activity of catalyst G in this experiment. Example 3 illustrates that the reformer catalyst B+D can be operated in the temperature regime between about 640° C. to about 680° C. with regular regeneration treatments in gas streams containing at least 0.5% $O_2$.

In summary, Example 3 shows that the Rh-based reforming catalysts B and D can be operated in the temperature range of about 640° C. to 680° C. provided regular $O_2$ treatments in the temperature range between about 680° C. to 690° C. are applied to regenerate the catalyst from coke and sulfur. The same experiment also shows that the dehydrocracking catalyst G cannot be operated and regenerated in these temperature regimes. Example 1 and 2 show that the dehydrocracking catalysts F and G can be operated and regenerated in a lower temperature range around 500° C. Example 1 also shows that the Rh-based reforming catalysts A and C cannot be regenerated at about 500° C. These findings support the utility of a new converter configuration that has an upstream reforming catalyst and a downstream dehydrocracking catalyst and is operated such that the temperature in the upstream reforming is higher than than that of the downstream cracking catalyst.

Example 4

A kinetic converter model has been developed using ASPEN software based on kinetic data from the isothermal evaluation of the reforming and dehydrocracking catalysts on a model fuel. The model allowed simulation of the adiabatic temperature drop as well as the composition of the converter out reformed/cracked EGR/fuel mixtures. The lower heating value gain was calculated from the composition of the converter inlet and outlet gas streams. Certain operating conditions were considered where the temperature of the EGR was increased by precombustion of a portion of the fuel. Simulations are based on kinetics measured for fresh reforming catalyst A and dehydrocracking catalyst F on model fuel. The model fuel composition used for the reactor tests and simulation is given in Table 2.

TABLE 2

| Fuel component | Vol % |
| --- | --- |
| n-hexane | 15 |
| 3-methylpentane | 45 |
| 2,2,4-trimethylpentane | 10 |
| Toluene | 20 |
| Ethanol | 10 |

The following set of reactions were modeled in ASPEN:
Reforming Reactions Over the Reforming Catalyst:

$$N-C_6H_{14} + 6H_2O => 6CO + 13H_2 \qquad 1)$$

$$Iso-C_6H_{14} + 6H_2O => 6CO + 13H_2 \qquad 2)$$

$$\text{Iso-}C_8H_{18}+8\ H_2O =\!> 8CO+17H_2 \quad\quad 3)$$

$$C_7H_8+H_2O=\!>C_6H_6+CO+2H_2 \quad\quad 4)$$

$$C_2H_6O+H_2O=\!>2CO+4H_2 \quad\quad 5)$$

$$CO+H_2O=CO_2+H_2 \quad\quad 6)$$

Cracking/Dehydrocracking Reactions Over the Cracking Catalyst:

$$\text{N--}C_6H_{14}=\!>2C_3H_6+H_2 \quad\quad 7)$$

$$\text{Iso-}C_6H_{14}=\!>2\ C_3H_6+H_2 \quad\quad 8)$$

$$\text{Iso-}C_8H_{18}=\!>C_3H_6+C_4H_8+CH_4 \quad\quad 9)$$

The activation energies and pre-exponential factors are listed in Table 3.

TABLE 3

| Fuel component | Reforming A (mol frac.) | Reforming Ea (cal/mol) | Cracking/Dehydrocracking A (mol frac.) | Cracking/Dehydrocracking Ea (cal/mol) |
|---|---|---|---|---|
| n-$C_6H_{14}$ | 1095 | 1.43E+04 | 3.8E+4 | 2.06E+4 |
| Iso-$C_6H_{14}$ | 1263 | 1.51E+04 | 1.26E+5 | 2.06E+4 |
| Iso-$C_8H_{18}$ | 51268 | 2.27E+04 | 3.6E+5 | 2.0E+4 |
| Toluene | 2.83E+6 | 2.46E+4 | NA | NA |

The water gas shift (WGS) reaction (6) was set to be in equilibrium. The pre-exponential factor for the ethanol reforming reaction (5) was set to a high enough value so as to achieve near complete conversion of ethanol. In order to assess the property of combustion speed, laminar flame speeds were calculated from the standard Chemkin-II PREMIX [see R. J. Kee, F. M. Rupley, J. A. Miller. Chemkin-II: A Fortran chemical kinetics package for the analysis of gas-phase chemical kinetics, SAND-89-8009, Sandia National Laboratories, 1989 and R. J. Kee, J. F. Grcar, J. A. Miller, M. D. Smooke. A FORTAN program for modeling steady laminar one-dimensional premixed flames, SAND 85-8240, Sandia National Laboratories, 1985] package at the initial 300K unburnt temperature and 1 atm pressure. The laminar flame speed is defined as the speed at which the flame front propagates into a static unburnt air/fuel mixture without turbulence. The actual combustion speed of the air/fuel mixtures in the cylinder are known to generally increase with laminar flame speed.

The results of the simulation for two sets of cases with different fueling rates at 30% EGR are summarized in Table 4 below.

TABLE 4

| Case | 1a | 1b | 2a | 2b |
|---|---|---|---|---|
| Converter Configuration | R | R + C | R | R + C |
| Converter Rhodium, g | 1 | 1 | 1 | 1 |
| Converter Rhodium utilized, % | 73% | 73% | 100% | 100% |
| Converter Zeolite, g | | 286 | | 286 |
| Fuel Rate, g/s | 1 | 1 | 2.8 | 2.8 |
| EGR Rate, % | 30 | 30 | 30 | 30 |

TABLE 4-continued

| Case | 1a | 1b | 2a | 2b |
|---|---|---|---|---|
| Reformer Temp IN, ° C. | 700 | 700 | 700 | 700 |
| Reformer Temp OUT = Cracker Temp IN, ° C. | 550 | 550 | 581 | 581 |
| Cracker Temp OUT, ° C. | | 495 | | 537 |
| ☐T (reformer), ° C. | 150 | 150 | 119 | 119 |
| ☐T (cracker), ° C. | | 55 | | 43 |
| Total Fuel Conversion | 31% | 61% | 25% | 49% |
| Fuel + EGR Composition | mole fraction | | mole fraction | |
| H2O | 0.078 | 0.077 | 0.09 | 0.088 |
| N2 | 0.637 | 0.622 | 0.64 | 0.635 |
| CO2 | 0.117 | 0.114 | 0.11 | 0.115 |
| CO | 0.039 | 0.038 | 0.03 | 0.033 |
| H2 | 0.093 | 0.100 | 0.07 | 0.080 |
| CH4 | 0.000 | 0.003 | 0.00 | 0.002 |
| n-Hexane | 0.005 | 0.004 | 0.00 | 0.005 |
| iso-Hexane (3MP) | 0.017 | 0.008 | 0.01 | 0.011 |
| iso-Octane | 0.003 | 0.000 | 0.00 | 0.001 |
| Propene | 0.000 | 0.021 | 0.00 | 0.017 |
| Iso-Butene | 0.000 | 0.003 | 0.00 | 0.002 |
| Toluene | 0.004 | 0.004 | 0.00 | 0.005 |
| Benzene | 0.007 | 0.006 | 0.00 | 0.005 |
| Ethanol | 0.000 | 0.000 | 0.00 | 0.000 |
| Total | 1.000 | 1.000 | 1.00 | 1.000 |
| LHV gain from fuel conversion, % | 3.6 | 6.3 | 2.9 | 5.0 |
| Net LHV gain, % | −2.0 | 0.7 | 0.9 | 3.1 |
| Flame Speed, cm/s | 15.6 | 17 | 14 | 15.3 |

Cases 1a and 1b compare reforming only (R) with reforming plus cracking (R+C) at 1 g/s fueling rate, assuming an engine out EGR temperature of 530° C. Cases 2a and 2b compare R with R+C at 2.8 g/s fueling rate assuming 640° C. engine out temperature. In all cases the reformer inlet temperature was raised from the engine out temperature level to 700° C. The pre-combustion of a portion of fuel in front of the converter is associated with a fuel penalty. The combined heat recovery from the fuel processing in the converter and the fuel penalty from the fuel pre-combustion is referred to as net LHV gain, and is expressed as percent of the heating value of the unprocessed raw fuel. At lower fueling rates the engine out temperature is lower and hence a larger amount of fuel has to be pre-combusted in front of the reformer to raise the EGR/fuel temperature to the target temperature. This resulted in a negative net LHV gain across the reformer catalyst in case 1a. In case 2a a slightly positive net LHV gain was obtained with the same amount of Rh catalyst because of the elevated engine out temperature at the higher fueling rate in case 2a.

For both fueling rates, the total fuel conversion was almost doubled by the addition of the cracking catalyst. This resulted in a noticeable increase in net LHV gain which was positive in both cases 1b and 2b. At the same time, the formation of olefins from the dehydrocracking process enhanced the flame speed. The elevated flame speed is generally considered to translate into higher combustion speeds inside the cylinder. The addition of olefinic cracked products along with some additional $H_2$ from the dehydrocracker catalyst can therefore facilitate engine operation at the elevated EGR levels where combustion speed is slowed by dilution with recirculated exhaust.

Example 4 provides qualitative proof for the advantage of the R+C converter concept to increase engine efficiency relative to the R only converter. Exact values of the fuel conversion, the reformed and cracked EGR/fuel composition and the LHV gain depend on the nature of the catalyst and its kinetic parameters.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A method of operating a power system comprising,
an engine configured to combust an air/fuel mixture and produce a flow of exhaust gas;
an exhaust passageway fluidly connected to the engine to receive the flow of exhaust gas;
an exhaust gas recirculation loop fluidly connecting the exhaust passageway to a fuel intake for the engine;
a first conversion zone containing a fuel reforming catalyst located within the exhaust gas recirculation loop; and
a second conversion zone located within the exhaust gas recirculation loop separate from and downstream of the first conversion zone stream, the second conversion zone containing a fuel cracking catalyst,
the method comprising:
(a) supplying a mixture comprising exhaust gas and a first hydrocarbon-containing fuel to an inlet of the first conversion zone at a first temperature to convert a portion of the fuel in the presence of the reforming catalyst into CO and $H_2$ to produce a reformed gaseous mixture, wherein the first temperature, as measured at the inlet to the first conversion zone, is in a range from greater than 550° C. to about 700° C.;
(b) supplying the reformed gaseous mixture to the second conversion zone at a second temperature lower than the first temperature to convert paraffins in a further portion of the fuel in the presence of the cracking catalyst into olefins to produce a reformed and cracked gaseous mixture;
(c) introducing at least a portion of the reformed and cracked gaseous mixture and a second hydrocarbon-containing fuel into the engine, wherein said second hydrocarbon-containing fuel may be the same or different from the first hydrocarbon-containing fuel;
(d) combusting the at least a portion of the reformed and cracked gaseous mixture and second hydrocarbon-containing fuel in the engine to form an exhaust gas; and
(e) recycling part of the exhaust gas to step (a).

2. The method of claim 1, wherein the mixture supplied to the first conversion zone in (a) further comprises air.

3. The method of claim 2 and further comprising adjusting the amount of air supplied to the first conversion zone in (a) according to the first temperature.

4. The method of claim 1, wherein the second temperature, as measured at the inlet to the second conversion zone, is from 500 to 550° C. in (b).

5. The method of claim 1, wherein the fuel to air ratio in the mixture supplied to the first conversion zone is controlled at a first value during step (a) wherein the mixture is fuel-rich with respect to combustion stoichiometry.

6. The method of claim 5 and further comprising:
(f) periodically adjusting the fuel to air ratio in the mixture supplied to the first conversion zone to a second value wherein the mixture is air-rich with respect to combustion stoichiometry to effect regeneration of the reforming catalyst.

7. The method of claim 6, wherein air is also supplied to the second conversion zone during step (f).

8. The method of claim 6, wherein the mixture supplied to the first conversion zone is at the first value for a time t1 and is at the second value for a time t2, wherein the ratio of t1:t2 is at least 5.

9. The method of claim 8, wherein time t2 is less than or equal to 10 minutes.

10. The method of claim 1, wherein the reformed and cracked gaseous mixture produced in (b) has a higher octane number and LHV than the mixture supplied to the first conversion zone in (a).

11. The method of claim 1, wherein the fuel reforming catalyst comprises rhodium on a refractory support.

12. The method of claim 11, wherein the refractory support comprises a metal oxide and/or a molecular sieve.

13. The method of claim 11, wherein the refractory support comprises a metal oxide selected from the group consisting of alumina, silica, silica-alumina, lanthana, ceria, zirconia and mixtures thereof.

14. The method of claim 11, wherein the refractory support comprises a molecular sieve having the CHA structure type.

15. The method of claim 1, wherein the fuel cracking catalyst comprises metal-promoted MCM-68.

16. The method of claim 15, wherein the metal is selected from the group consisting of platinum, zinc, gallium and mixtures thereof.

17. The method of claim 11, wherein the weight ratio of the fuel cracking catalyst to the rhodium on the fuel reforming catalyst is at least 20.

18. The method of claim 1, wherein the power system further comprises:
a first injector for supplying air to the first conversion zone;
a second injector operable independently of the first injector for supplying air to the second conversion zone.

19. The method of claim 1, wherein the power system further comprises:
a pre-combustion catalyst located within the exhaust gas recirculation loop upstream of the fuel reforming catalyst for raising the temperature of the exhaust gas by catalytic partial oxidation of fuel.

* * * * *